United States Patent [19]

Moriguchi et al.

[11] 4,322,733
[45] Mar. 30, 1982

[54] HEAT SENSITIVE RECORDING HEAD DRIVE DEVICE

[75] Inventors: Haruhiko Moriguchi; Takashi Ohmori, both of Kanagawa, Japan

[73] Assignee: Fuji Xerox Co., Ltd., Tokyo, Japan

[21] Appl. No.: 127,690

[22] Filed: Mar. 6, 1980

[30] Foreign Application Priority Data

Mar. 22, 1979 [JP] Japan .................................. 54-32240

[51] Int. Cl.³ ........................ G01D 15/10; H05B 1/00
[52] U.S. Cl. ................................ 346/76 PH; 219/216
[58] Field of Search ..................... 346/76 PH; 219/216

[56] References Cited

U.S. PATENT DOCUMENTS

| | | | |
|---|---|---|---|
| 3,934,695 | 1/1976 | Kovalick | 219/216 X |
| 4,032,925 | 6/1977 | Kos | 346/76 PH |
| 4,091,391 | 5/1978 | Kozima et al. | 346/76 PH |
| 4,113,391 | 9/1978 | Minowa | 219/216 X |
| 4,168,421 | 9/1979 | Ito | 346/76 PH X |
| 4,219,824 | 8/1980 | Asai | 346/76 PH |

Primary Examiner—George H. Miller, Jr.
Attorney, Agent, or Firm—Sughrue, Mion, Zinn, Macpeak and Seas

[57] ABSTRACT

A drive device for a heat sensitive recording head in which the heat generating elements in an entire array generate heat uniformly. The heat generating elements within an array-type heat sensitive recording head are separated into groups. Voltage dropping elements connect the various heat generating elements to common terminals, one of which is provided for each group. The voltage drops provided by the various voltage dropping elements are adjusted such that the heat generating elements produce heat uniformly so that the image recorded is uniform over the entire recording surface.

6 Claims, 11 Drawing Figures

HEAT SENSITIVE RECORDING HEAD DRIVE DEVICE

BACKGROUND OF THE INVENTION

The invention relates to a drive device for a heat sensitive recording head used in a facsimile printer or the like.

In a prior heat sensitive recording head of this general type intended for line scanning, the drive leads correspond to the recording positions in the ratio of 1:1, that is, one drive head is provided for each recording position. However, such a heat sensitive recording head is disadvantageous in that, where recording must be carried out with high recording density so as to obtain a high quality, the distance between the leads is necessarily short and, accordingly, it is difficult to connect the leads to the drive circuit.

In order to overcome this difficulty, a recording head as shown in FIG. 1 has been proposed. In this head, leads b are disposed along both sides of a substrate a and heat generating elements c are provided between the ends of the leads b so that the lead spacing on each side is twice the spacing between heat generating elements c. However, this recording head is disadvantageous in that the recording positions do not correspond directly to the leads b and, accordingly, the recording head cannot be driven by a conventional drive circuit.

In order to eliminate these drawbacks, a drive circuit as shown in FIGS. 2A-2D has been proposed. In this drive circuit, data signals to be recorded are divided into two groups, namely, an odd-number group and an even-number group according to the recording position arrangement and the data signals of each of the groups are further divided into plural groups and the heat generating elements c are driven by the data signals thus processed. However, this drive technique is still disadvantageous in that, as four separate structures are required as illustrated by FIGS. 2A-2D, the recording speed is relatively slow.

A drive device as shown in FIGS. 3A and 3B has been known, which was intended for eliminating the above-described difficulty. In that drive device, data signals to be recorded are distributed to every other element according to the recording position arrangement with two such groups of data signals provided to drive the heat generating elements c. With this drive technique, the driving time is reduced to a half of that in the case of FIGS. 2A-2D, that is, the driving speed is doubled.

In general, a heat sensitive recording head employed in facsimile is rather long. Thus, a typical practical recording head is formed by plural blocks divided into two groups with one line of a picture provided by repeatedly driving the heat sensitive elements with the drive circuit. In the case, if the same energy is supplied to a first selected group of heat sensitive elements in one block and then to a second selected group, the second group is affected by residual heat from the first group as a result of which the coloring density becomes higher and the printing dot size becomes larger for the second group. That is, the formed picture is non-uniform in its entirety. Therefore, the heat sensitive recording head shown in FIG. 3 is employed with a technique in which the heat generating elements are driven by making the amount of electrical energy supplied to the first group different from that supplied to the second group so as to provide a uniform picture. However, it should be noted that the required drive circuit is intricate in construction and high in manufacturing cost.

SUMMARY OF THE INVENTION

In view of the foregoing, an object of the present invention is to provide a drive device for a heat sensitive recording head in which elements having different voltage drops are connected to first and second groups of heat generating elements so as to cause the heat generating elements to generate heat uniformly and for which the accompanying drive circuit device is simple in construction and low in manufacturing cost.

In accordance with this and other objects of the invention, there is provided a drive device for a heat sensitive recording head including a substrate, a plurality of heat generating elements disposed on the substrate, a plurality of leads alternately arranged along opposite sides of the substrate with the leads being in operative contact with corresponding ones of the heat generating elements and a plurality of voltage dropping elements. The heat generating elements are divided into a plurality of groups with the leads each being connected through a voltage dropping element to one of a plurality of common terminals, one of the common terminals being provided for each group of leads such that data signals may be coupled to the heat generating elements through the common terminals separately to each group to drive the heat generating elements within the various groups. The voltage dropping elements are selected such that the heat generating elements produce their heat outputs uniformly so as to produce a uniformly recorded image. In a first embodiment, voltage dropping elements connected to one of the groups have a different voltage drop from the voltage dropping elements connected to other ones of the groups of heat generating elements. In a second embodiment, one of the voltage dropping elements is coupled between one of the common terminals and a source of the data signals with the one voltage dropping element having a voltage drop different from the other ones of the voltage dropping elements. In a third embodiment, predetermined ones of the heat generating elements disposed in predetermined regions which include at least both ends of the first group are connected to ones of the voltage dropping elements having a relatively small voltage drop, ones of the heat generating elements which are disposed in a region which includes at least an end of a group adjacent to the first group are connected to ones of the voltage dropping elements having a relatively large voltage drop, and remaining ones of the heat generating elements being connected to voltage dropping elements whose voltage drop is intermediate those of the voltage drop elements having the relatively large and relatively small voltage drops. The voltage dropping elements may be resistors or diodes or mixtures thereof.

DESCRIPTION OF THE PREFERRED EMBODIMENTS

Figure 1:
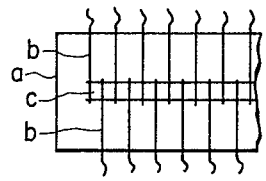
FIG. 1 is a plan view showing a heat sensitive recording head of the prior art.
Figure 2A:
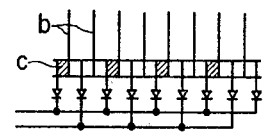
FIGS. 2A through 2D are a series of schematic diagrams showing a first type of conventional heat sensitive recording head drive circuit.
Figure 2B:
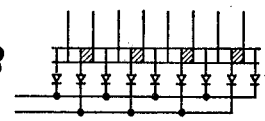
Figure 2C:
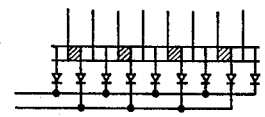
Figure 2D:
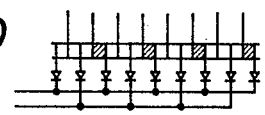
Figure 3A:
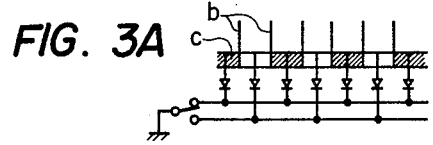
FIGS. 3A and 3B are schematic diagrams of a second type of conventional heat sensitive recording head drive circuit.
Figure 3B:
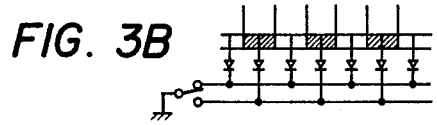
Figure 4:
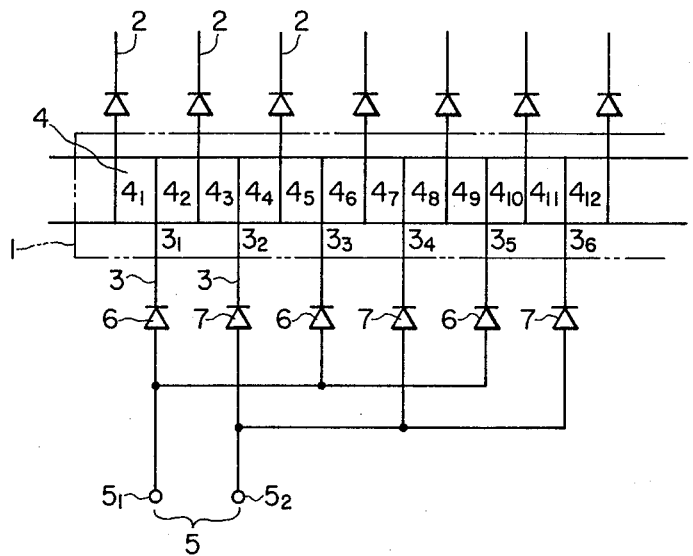
FIG. 4 is a schematic diagram relating to a first embodiment of a heat sensitive recording head drive device of the invention.

A first embodiment of a drive device for a heat sensitive recording head according to the invention is shown in FIG. 4. A substrate 1 made of ceramic or the like and a number of leads 2 and 3 are arranged alternately along both sides of the substrate 1. Heat generating elements 4 are disposed between the leads 2 and 3. Among the leads 3, the odd-numbered leads $3_1, 3_3, 3_5, \ldots$ are connected through voltage dropping elements, which are here implemented as diodes 6, to a common terminal $5_1$. The elements 6 are adapted to drop by a value VA the voltages applied to the heat generating elements. Similarly, among the leads 3, the even-numbered leads $3_2, 3_4, 3_6, \ldots$ are connected through diodes 7 to the other common terminal $5_2$. The elements 7 are adapted to drop by a value VB the voltages applied to the heat generating elements 4. The elements 6 and 7 are so selected that the voltage drop value VB is larger than the voltage drop value VA.

Therefore, even if equal input voltages are applied to the common terminals $5_1$ and $5_2$, a voltage which is reduced by the value VA by the diodes 6 is applied to the heat generating elements $4_1, 4_2, 4_5, 4_6, \ldots$ in the first group and a voltage which is reduced by the value VB by the diodes 7 is applied to the heat generating elements $4_3, 4_4, 4_7, 4_8, \ldots$ in the second group. Accordingly, with appropriate selection of VA and VB, the heat generated by the two groups of heat generating elements is uniform as a whole as a result of which the resultant picture is uniform in density and dot size and therefore high in quality.

Figure 5:
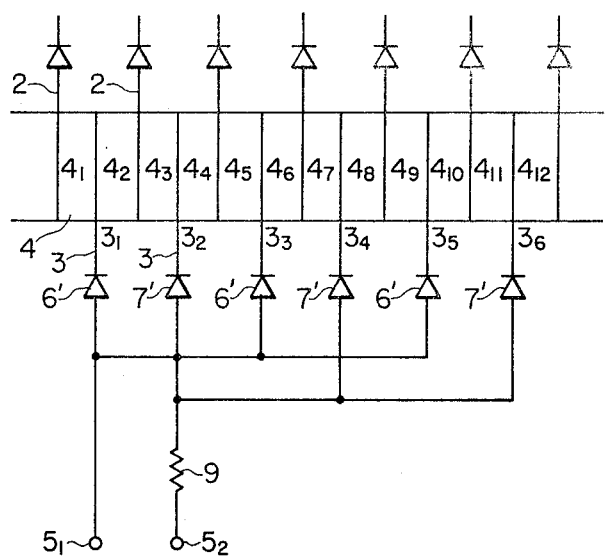
FIG. 5 is a schematic diagram relating to a second embodiment of a heat sensitive recording head drive device of the invention.

In the first embodiment described above, the diodes 6 and 7 having different forward voltage drops are connected to the odd-numbered leads $3_1, 3_3, \ldots$ and the even-numbered leads $3_2, 3_4, \ldots$, respectively. However, the same effect may be obtained by employing the following technique. As shown in FIG. 5, diodes 6' and 7' have equal forward voltage drops. A resistor 9 is connected between the common terminal $5_2$ and the diodes 7' connected to the even-numbered leads $3_2, 3_4, \ldots$ with the value of resistor 9 selected such that the amount of heat generated by the second group of heat generating elements is the same as that generated by the first group.

Figure 6:
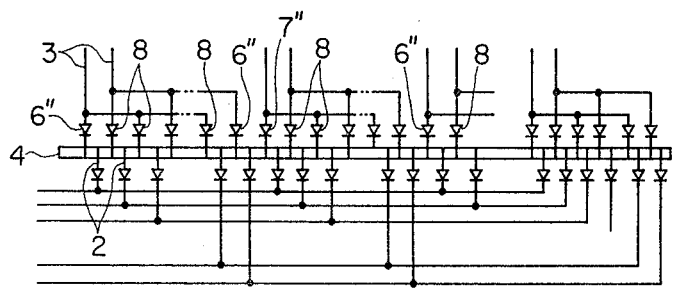
FIG. 6 is a schematic diagram relating to a third embodiment of a heat sensitive element drive device of the invention.
Figure 7:
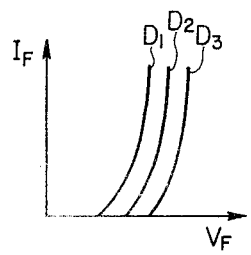
FIG. 7 is a graphical representation showing the voltage drop characteristics of three different types of voltage dropping elements used in the embodiment of FIG. 6.

Another example of a drive device according to the invention is shown in FIG. 6. Heat generating elements 4 divided into plural groups are arranged horizontally. In a first group, the heat generating elements 4 at both ends are coupled to diodes 6" which have a characteristic $D_1$ as shown in FIG. 7. In a second group, heat generating elements adjacent to those in the first group are connected to diodes 7" having a characteristic $D_3$ as shown in FIG. 7. In a third group, heat generating elements 4 adjacent to those in the second group are connected to diodes 6" having a characteristic $D_1$. The remaining heat generating elements 4 are connected to diodes 8 whose characteristic $D_2$ is between those of the diodes 6" and 7".

Thus, in the drive device shown in FIG. 6, the heat generating elements 4 at both ends in the first group are driven by a voltage supplied through the diodes 6" having the characteristic $D_1$. Among the heat generating elements 4 in the second group, the third group and so forth, heat generating elements adjacent to those in the front group are driven by a voltage applied through the diodes 7" having the characteristic $D_3$ while the remaining heat generating elements 4 are driven by a voltage supplied through the diodes 8 having the characteristic $D_2$ as a result of which the adjacent heat generating elements in the various groups, although they affect one another, they nonetheless generate heat uniformly as a whole. Therefore, the resultant picture is uniform in density and dot size and consequently of high quality.

The diodes 6", 7" and 8 connected to the respective heat generating elements 4 may be replaced by resistors having resistances of $R_{6''} < R_{7''} < R_8$.

As is clear from the above description, according to the invention, the heat generating elements which have a mutual effect upon one another in adjacent groups are connected to the voltage dropping elements which produce a relatively large voltage drop while the remaining heat generating elements are connected to elements which produce relatively small voltage drops so that heat is generated uniformly as a whole. Therefore, with the drive device according to the invention, even if the input voltages applied to the groups are equal, a picture having a uniform density and printing dot size is obtained.

Furthermore, since the drive device of the invention can be constructed merely by providing elements having different voltage drops, the drive device is simple in construction and low in manufacturing cost.

What is claimed is:

1. A drive device for a heat sensitive recording head comprising: a substrate, a plurality of heat generating elements disposed on said substrate, a plurality of leads alternately arranged along opposite sides of said substrate, said leads being in operative contact with corresponding ones of said heat generating elements, a plurality of voltage dropping elements, said heat generating elements being divided into a plurality of groups, said leads each being connected through a voltage dropping element to one of a plurality of common terminals, one of said common terminals being provided for each group of said leads such that data signals of the same voltage may be inputted through said common terminals separately according to said groups to successively drive said heat generating elements in said groups, said voltage dropping elements being selected such that said heat generating elements generate heat uniformly.

2. The drive device of claim 1 wherein said voltage dropping elements connected to any one of said groups of heat generating elements have the same voltage drop and wherein voltage dropping elements connected to different ones of said groups of heat generating elements have different voltage drops.

3. The drive device of claim 1 wherein one of said voltage dropping elements is coupled between one of said common terminals and a source of said data signals, said one voltage dropping element having a voltage drop different from others of said voltage dropping elements.

4. The drive device of any of claims 1-3 wherein said voltage dropping elements comprise diodes.

5. The drive device of any of claims 1-3 wherein said voltage dropping elements comprise resistors.

6. The drive device of claims 3 wherein said one voltage dropping element comprises a resistor and said others of said voltage dropping elements comprise diodes.

* * * * *